United States Patent [19]
Sugai et al.

[11] Patent Number: 5,586,245
[45] Date of Patent: Dec. 17, 1996

[54] DATA PROCESSOR HAVING PAGE TURNING FUNCTION FOR MANAGING A PLURALITY OF DATA SETS

[75] Inventors: Toshimi Sugai; Fumihisa Kobayashi; Masao Nagae, all of Kawasaki; Eiko Yagishita, Numazu, all of Japan

[73] Assignee: Fujitsu Limited, Kawasaki, Japan

[21] Appl. No.: 233,422

[22] Filed: Apr. 28, 1994

[30] Foreign Application Priority Data

Jul. 29, 1993 [JP] Japan ................................ 5-187894

[51] Int. Cl.$^6$ ................................................. G06F 15/00
[52] U.S. Cl. ........................................... 395/344; 395/326
[58] Field of Search ................................. 395/155–161, 395/600; 358/403

[56] References Cited

U.S. PATENT DOCUMENTS

| | | | |
|---|---|---|---|
| 5,029,112 | 7/1991 | Sakamoto et al. | 364/521 |
| 5,220,648 | 6/1993 | Sato | 395/146 |
| 5,383,029 | 1/1995 | Kojima | 358/403 |
| 5,463,725 | 10/1995 | Henkel et al. | 395/155 |
| 5,515,497 | 5/1996 | Itri et al. | 395/159 |
| 5,519,827 | 5/1996 | Mizushima | 395/161 |

FOREIGN PATENT DOCUMENTS

| | | |
|---|---|---|
| 0493668 | 7/1992 | European Pat. Off. . |
| 1-152575 | 6/1989 | Japan . |
| 2-230375 | 9/1990 | Japan . |
| 5-067154 | 3/1993 | Japan . |
| 5-094438 | 4/1993 | Japan . |
| 2187580 | 9/1987 | United Kingdom . |
| 2238894 | 6/1991 | United Kingdom . |

OTHER PUBLICATIONS

*Computer Shopper*, No. 49, Mar. 1992 (London), Huw Collingbourne, "Making plans", pp. 285–286.

Primary Examiner—Raymond J. Bayerl
Assistant Examiner—A. Katbab
Attorney, Agent, or Firm—Staas & Halsey

[57] ABSTRACT

A data processor having a page turning function, for managing a plurality of data sets each containing a plurality of data units of different kinds, has an extraction portion, a decision portion, and an output control portion. The extraction portion is used to extract a data unit in a page ahead of the present page in response to a next page instruction, or in a page behind the present page in response to a previous page instruction, and the decision portion is used to determine whether or not the kind of the data unit extracted by the extraction portion is equal to the kind of a data unit in the present page. The output control portion is used to provide the data unit extracted by the extraction portion if the decision portion determines that they are equal to each other, and if the decision portion determines that they are unequal to each other, restarting the extraction process of the extracting portion. Therefore, the page turning operation can be rapidly and easily carried out.

20 Claims, 11 Drawing Sheets

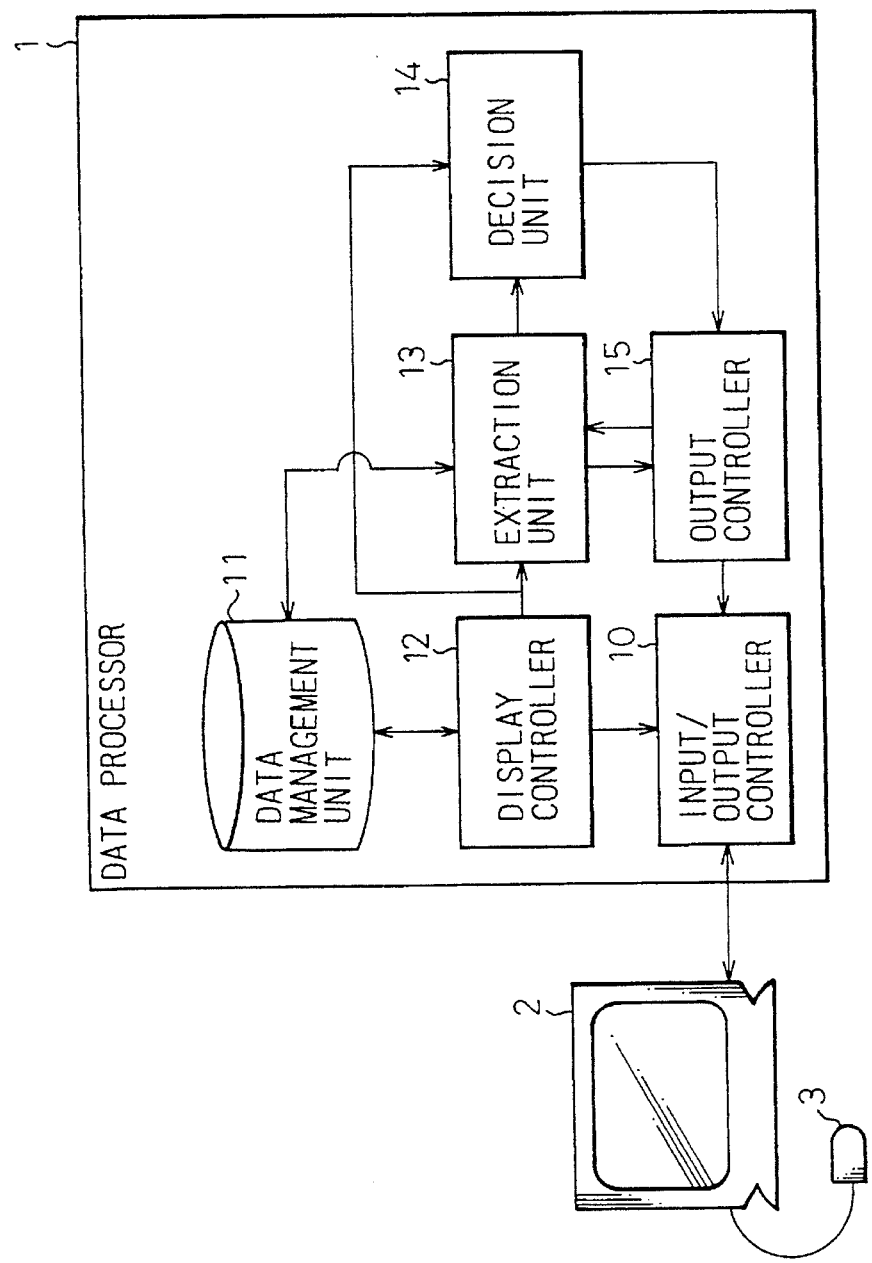

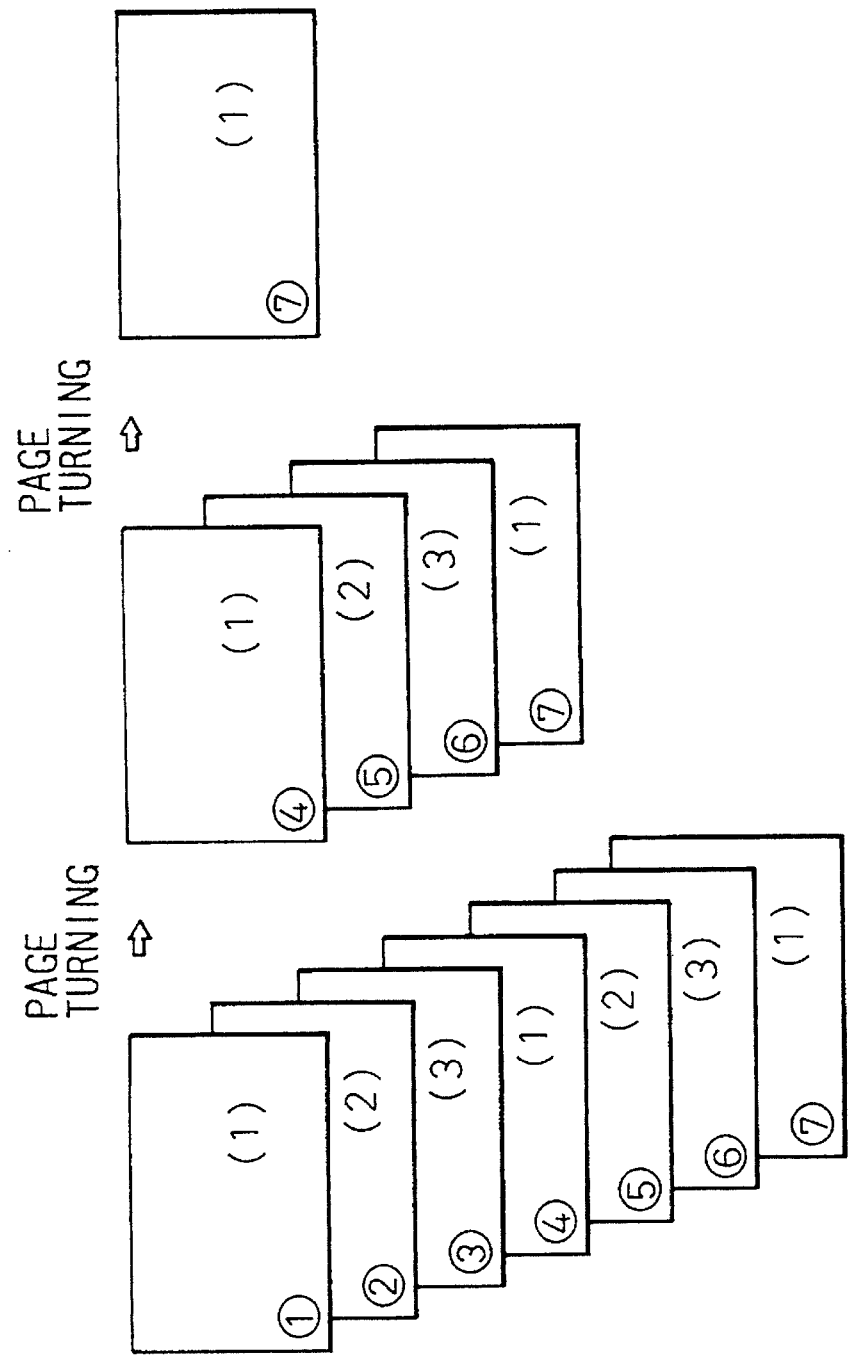

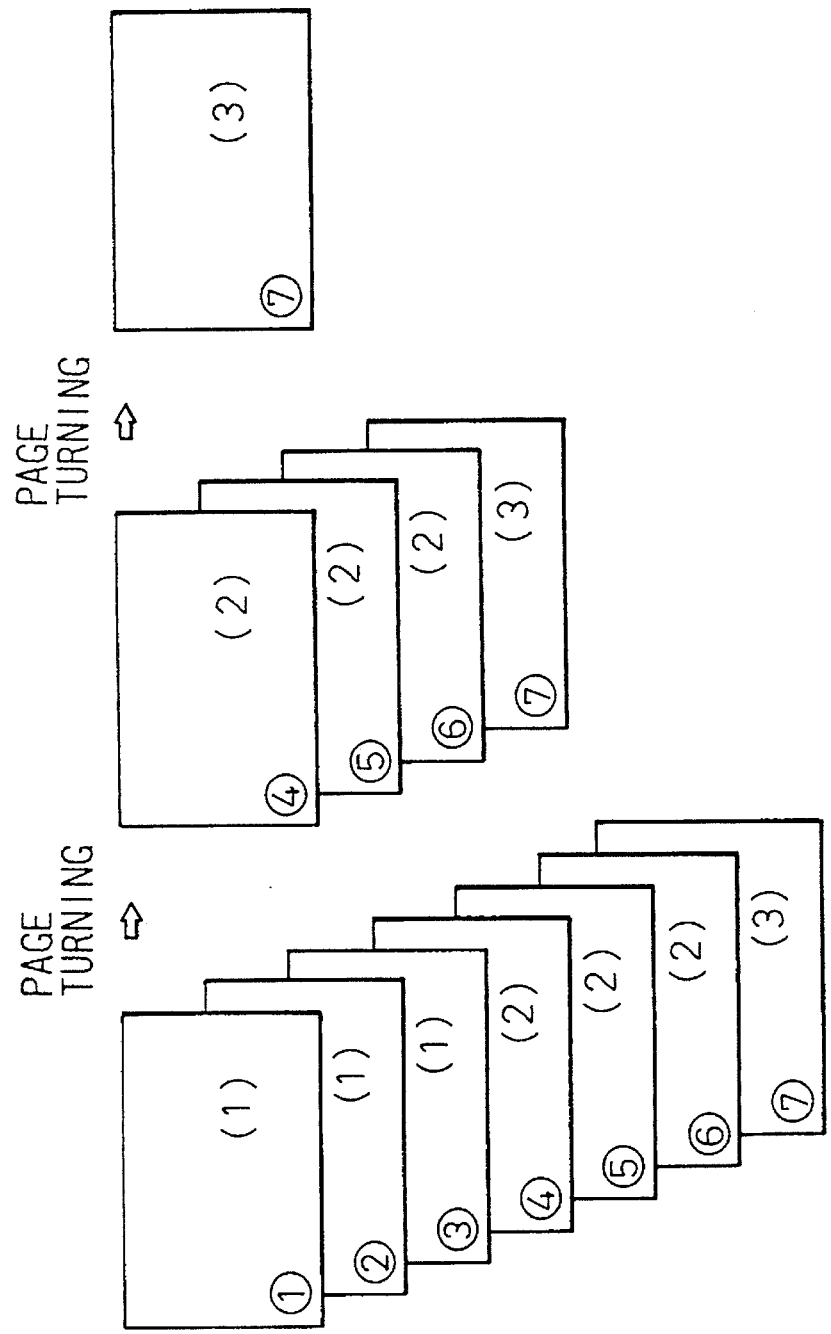

DATA PROCESSOR HAVING PAGE TURNING FUNCTION FOR MANAGING A PLURALITY OF DATA SETS

BACKGROUND OF THE INVENTION

1. Field of the Invention

The present invention relates to a data processor having a page turning function and a method of turning pages of data, and more particularly, to a data processor having a page turning function for efficiently turning pages according to the attributes of data in the pages and a method of efficiently turning pages of data according to the attributes of the data.

2. Description of the Related Art

A data processor manages a plurality of data units, extracts a data unit in a required page, and displays the extracted data unit. The data processor must efficiently extract any one of the data units according to the attributes of the data units.

A conventional data processor has a previous page key and a next page key to control a plurality of data units. A user manipulates the previous page key to extract a data unit in one of the pages behind the present page and the next page key to extract a data unit in one of the pages in front of the present page. Namely, the user uses the previous page key to sequentially turn the pages in a backward direction to specify a required data unit in one of the pages, and the next page key to sequentially turn the pages in a forward direction to specify a required data unit in one of the pages. The specified data unit is displayed.

The conventional data processor is incapable of efficiently turning pages among a plurality of data sets each containing a plurality of data units of different kinds, among a plurality of data groups each containing a plurality of data units of the same kind, among copies of a set of different data units, or among a plurality of groups each containing copies of a data unit.

Among a plurality of data sets each containing a plurality of data units of different kinds, it is frequently requested to jump to a data unit in a page that is nearest to and behind or in front of the present page. In this case, the prior art must sequentially turn pages one by one to reach the data unit. Further, among a plurality of data groups each containing a plurality of data units of the same kind, the prior art is frequently requested to jump to a data unit that is different from the present data unit and in a page nearest to and behind or in front of the present page. In this case, the prior art must sequentially turn pages one by one to reach the data unit.

In addition, among copies of a set of different data units, it is frequently requested to jump to a data unit that is the same as the present data unit and in a page nearest to and behind or in front of the present page. In this case, the prior art must sequentially turn pages one by one to reach the data unit. Further, among a plurality of groups each containing copies of a data unit, it is frequently requested to jump to a data unit that is different from the present data unit and in a page nearest to and behind or in front of the present page. In this case, the prior art must sequentially turn pages one by one to reach the data unit.

SUMMARY OF THE INVENTION

An object of the present invention is to provide a data processor with a novel function for efficiently turning pages according to the attributes of data in the pages, and a novel method of efficiently turning pages according to the attributes of data in the pages.

According to the present invention, there is provided a data processor having a page turning function, for managing a plurality of data sets each containing a plurality of data units of different kinds, wherein the data processor comprises an extraction portion for extracting a data unit in a page ahead of the present page in response to a next page instruction, or in a page behind the present page in response to a previous page instruction; a decision portion for determining whether or not the kind of the data unit extracted by the extraction portion is equal to the kind of a data unit in the present page; and an output control portion for providing the data unit extracted by the extraction portion if the decision portion determines that they are equal to each other, and if the decision portion determines that they are unequal to each other, restarting the extraction process of the extracting portion.

The data processor may further comprise an input/output control portion for controlling input/output processes between the data processor and a terminal portion; a data management portion for managing the plurality of data sets; and a display control portion for displaying a data unit on a display of the terminal portion.

Further, according to the present invention, there is also provided a data processor having a page turning function, for managing a plurality of data groups each containing a plurality of data units of the same kind, wherein the data processor comprises an extraction portion for extracting a data unit in a page ahead of the present page in response to a next page instruction, or in a page behind the present page in response to a previous page instruction; a decision portion for determining whether or not the kind of the data unit extracted by the extraction portion is unequal to the kind of a data unit in the present page; and an output control portion for providing the data unit extracted by the extraction portion if the decision portion determines that they are unequal to each other, and if the decision portion determines that they are equal to each other, restarting the extraction process of the extracting portion.

The data processor may further comprise an input/output control portion for controlling input/output processes between the data processor and a terminal portion; a data management portion for managing the plurality of data groups; and a display control portion for displaying a data unit on a display of the terminal portion.

Furthermore, according to the present invention, there is provided a data processor having a page turning function, for managing copies of a set of different data units, wherein the data processor comprises a reception portion for receiving the number of the data units in the set; and an extraction portion for specifying a data unit in a page calculated by adding the number received by the reception portion to the number of the present page in response to a next page instruction, or by subtracting the number received by the reception portion from the number of the present page in response to a previous page instruction, extracting the specified data unit, and providing the extracted data unit.

The data processor may further comprise an input/output control portion for controlling input/output processes between the data processor and a terminal portion; a data management portion for managing the copies of the set; and a display control portion for displaying a data unit on a display of the terminal portion.

In addition, according to the present invention, there is also provided a data processor having a page turning function, for managing a plurality of groups each containing copies of a data unit, wherein the data processor comprises a reception portion for receiving the number of the copies in each group; and an extraction portion for specifying, according to the number of the present page and the number received by the reception portion, a different data unit in a page that is in front of and nearest to the present page in response to a next page instruction, or in a page that is behind and nearest to the present page in response to a previous page instruction, extracting the specified data unit, and providing the extracted data unit.

The data processor may further comprise an input/output control portion for controlling input/output processes between the data processor and a terminal portion; a data management portion for managing the plurality of groups; and a display control portion for displaying a data unit on a display of the terminal portion.

The data processor may be applied to a data processor system including a terminal unit connected to the data processor having a display for displaying a data unit, and an input unit connected to the terminal unit for inputting page turning instructions.

According to the present invention, there is provided a method of turning pages among a plurality of data sets each containing a plurality of data units of different kinds, wherein the method comprises a first step of extracting a data unit in a page ahead of the present page in response to a next page instruction, or in a page behind the present page in response to a previous page instruction; a second step of determining whether or not the kind of the data unit extracted in the first step is equal to the kind of a data unit in the present page; and a third step of providing the data unit extracted in the first step if the second step determines that they are equal to each other, and if the second step determines that they are unequal to each other, restarting the extraction process of the first step.

Further, according to the present invention, there is also provided a method of turning pages among a plurality of data groups each containing a plurality of data units of the same kind, wherein the method comprises a first step of extracting a data unit in a page ahead of the present page in response to a next page instruction, or in a page behind the present page in response to a previous page instruction; a second step of determining whether or not the kind of the data unit extracted in the first step is unequal to the kind of a data unit in the present page; and a third step of providing the data unit extracted in the first step if the second step determines that they are unequal to each other, and if the second step determines that they are equal to each other, restarting the extraction process of the first step.

Furthermore, according to the present invention, there is provided a method of turning pages among copies of a set of different data units, wherein the method comprises a first step of receiving the number of the data units in the set; and a second step of specifying a data unit in a page calculated by adding the number received in the first step to the number of the present page in response to a next page instruction, or by subtracting the number received by the first step from the number of the present page in response to a previous page instruction, extracting the specified data unit, and providing the extracted data unit.

In addition, according to the present invention, there is also provided a method of turning pages among a plurality of groups each containing copies of a data unit, wherein the method comprises a first step of receiving the number of the copies in each group; and a second step of specifying, according to the number of the present page and the number received in the first step, a different data unit in a page that is in front of and nearest to the present page in response to a next page instruction, or in a page that is behind and nearest to the present page in response to a previous page instruction, extracting the specified data unit, and providing the extracted data unit.

BRIEF DESCRIPTION OF THE DRAWINGS

The present invention will be more clearly understood from the description of the preferred embodiments as set forth below with reference to the accompanying drawings, wherein:

FIG. 1A is a diagram showing a first configuration of a data processor system applying a principle of the present invention;

FIG. 9 is a diagram for explaining an example of the page turning process of FIG. 7; and FIG. 10 is a diagram for explaining another example of the page turning process of FIG. 7.

DESCRIPTION OF THE PREFERRED EMBODIMENTS

Below, embodiments of a data processor having a page turning function according to the present invention will be explained with reference to the accompanying drawings.

Figure 1B:
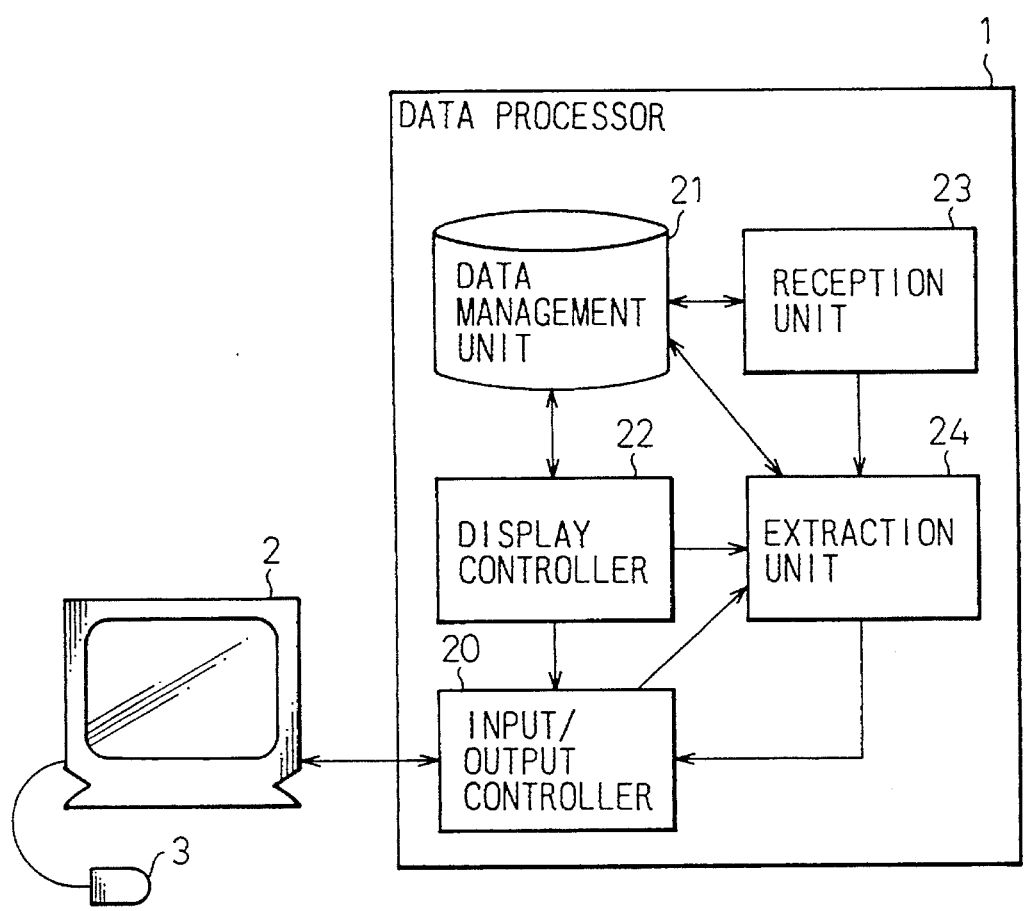
FIG. 1B is a diagram showing a second configuration of a data processor system applying a principle of the present invention.

FIGS. 1A and 1B show first and second configurations applying a principle of the present invention.

In FIGS. 1A and 1B, reference numeral 1 denotes a data processor, 2 denotes a terminal unit, 3 denotes an input unit.

As shown in FIG. 1A, the data processor 1 of the first configuration according to the present invention has an input/output controller 10, a data management unit 11, a display controller 12, an extraction unit 13, a decision unit 14, and an output controller 15. According to user's interactive operations, the input unit 3 issues a next page instruction or a previous page instruction.

The input/output controller 10 controls input/output processes between the data processor 1 and the terminal unit 2. The data management unit 11 manages a plurality of data sets each containing a plurality of data units of different kinds, or a plurality of data groups each containing a plurality of data units of the same kind. The display controller 12 displays a data unit on a display of the terminal unit 2 under the management of the data management unit 11.

The extraction unit 13 extracts one of the data units managed by the data management unit 11. The decision unit 14 determines whether the kind of the data unit extracted by the extraction unit 13 is equal or unequal to the kind of a data unit in the present page. The output controller 15 provides the extracted data, or restarts the extraction unit 13 to extract another data unit.

As shown in FIG. 1B, the data processor 1 of the second configuration according to the present invention has an input/output controller 20, a data management unit 21, a display controller 22, a reception unit 23, and an extraction unit 24. According to a user's interactive operations, the input unit 3 issues a next page instruction or a previous page instruction.

The input/output controller 20 controls input/output processes between the data processor 1 and the terminal unit 2. The data management unit 21 manages copies of a set of different data units, or a plurality of groups each containing copies of a data unit. The display controller 22 displays a data unit on a display of the terminal unit 2 under the management of the data management unit 21.

When the data management unit 21 manages copies of a set of different data units, the reception unit 23 refers to management data in the data management unit 21 and obtains the number of the data units in the set. When the data management unit 21 manages a plurality of groups each containing copies of a data unit, the reception unit 23 obtains the number of the copies in each group. The extraction unit 24 extracts one of the data units managed by the data management unit 21 according to a result of a page turning process.

In the data processor 1 of FIG. 1A, the data management unit 11 may manage a plurality of data sets each containing a plurality of data units of different kinds. When the input unit 3 issues a next or previous page instruction, the extraction unit 13 extracts a data unit in a page that is in front of or behind the present page now being displayed by the display controller 12.

The decision unit 14 determines whether or not the kind of the data unit extracted by the extraction unit 13 is equal to the kind of the data unit in the present page. If the decision unit 14 determines that they are equal to each other, the output controller 15 provides the data unit extracted by the extraction unit 13. If the decision unit 14 determines that they are unequal to each other, the output controller 15 restarts the extraction process of the extraction unit 13. The extraction unit 13 then extracts a data unit in a page in front of or behind the just extracted page.

After repeating these processes, the output controller 15 provides a data unit that is of the same kind as that presently displayed and in a page nearest to and behind or in front of the present page. The data unit thus provided is displayed.

In the data processor 1 of FIG. 1A, the data management unit 11 may manage a plurality of data groups each containing a plurality of data units of the same kind. When the input unit 3 issues a previous or next page instruction, the extraction unit 13 extracts a data unit in a page that is behind or in front of the present page now being displayed by the display controller 12.

The decision unit 14 determines whether or not the kind of the data unit extracted by the extraction unit 13 is unequal to the kind of the data unit in the present page. If the decision unit 14 determines that they are unequal to each other, the output controller 15 provides the data unit extracted by the extraction unit 13. If the decision unit 14 determines that they are equal to each other, the output controller 15 restarts the extraction process of the extraction unit 13. The extraction unit 13 then extracts a data unit in a page behind or in front of the just extracted page.

After repeating these processes, the output controller 15 provides a data unit that is of a different kind from that presently displayed and in a page nearest to and behind or in front of the present page. The data unit thus provided is displayed.

In the data processor 1 of FIG. 1B, the data management unit 21 may manage copies of a set of different data units. When the input unit 3 issues a previous page instruction, the extraction unit 24 extracts a data unit in a page calculated by subtracting the number received by the reception unit 23 from the number of the present page. When the input unit 3 issues a next page instruction, the extraction unit 24 extracts a data unit in a page calculated by adding a number received by the reception unit 23 to the number of the present page. The extracted data unit is provided.

Through these processes, the extraction unit 24 extracts a data unit that is the same as that presently displayed and in a page nearest to and in front of or behind the present page. The extracted data unit is displayed.

In the data processor 1 of FIG. 1B, the data management unit 21 may manage a plurality of groups each containing copies of a data unit. When the input unit 3 issues a previous page instruction, the extraction unit 24 extracts, according to the number of the present page and the number received by the reception unit 23, a different data unit in a page that is behind and nearest to the present page. When the input unit 3 issues a next page instruction, the extraction unit 24 extracts, according to the number of the present page and a number received by the reception unit 23, a different data unit in a page that is in front of and nearest to the present page. The extracted data unit is provided.

Through these processes, the extraction unit 24 extracts a data unit that is different from that presently displayed and in a page nearest to and in front of or behind the present page. The extracted data unit is displayed.

In this way, the present invention efficiently turns pages according to the attributes of data in the pages.

Figure 2:
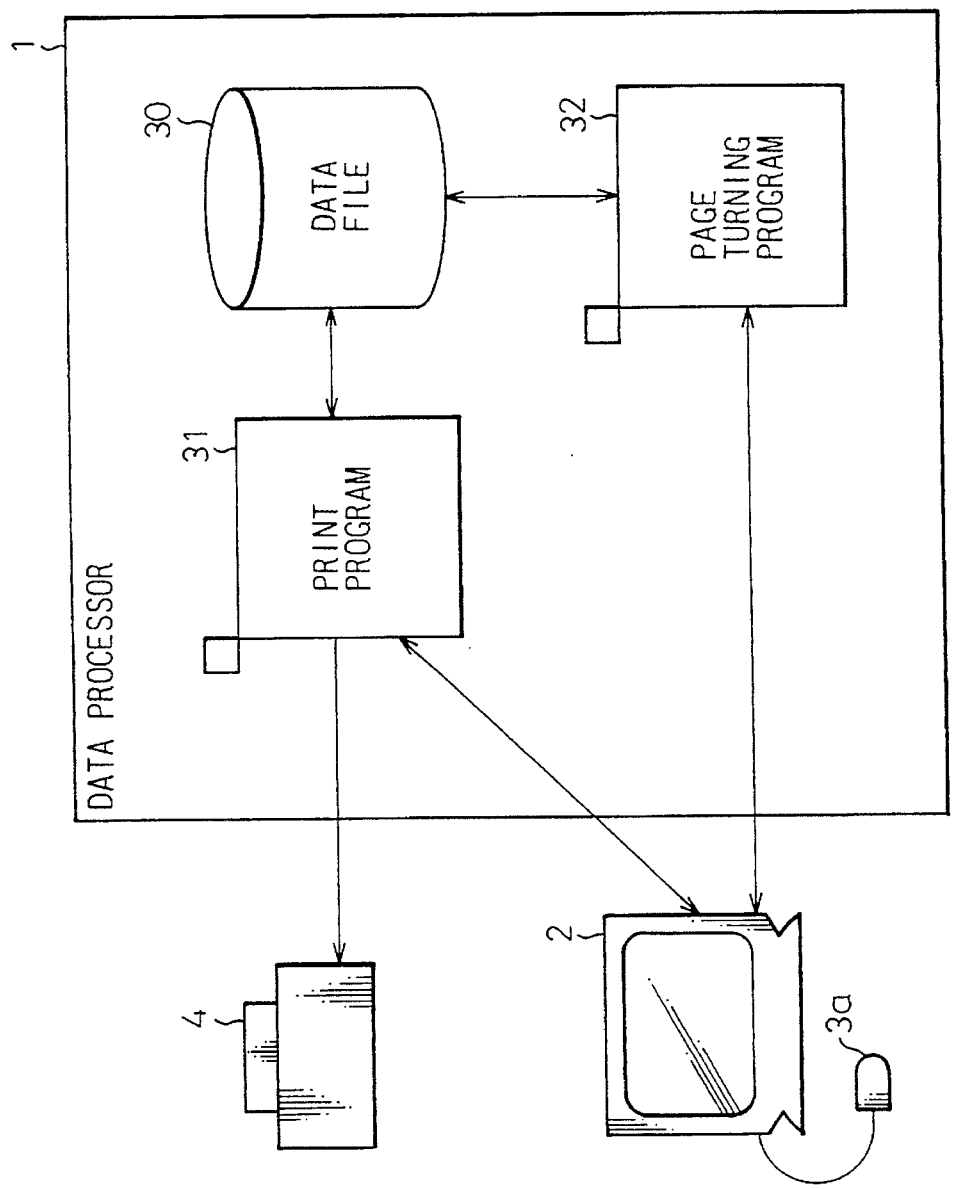
FIG. 2 is a diagram showing an embodiment of a data processor system according to the present invention.

FIG. 2 shows an embodiment of a data processor system according to the present invention. In FIG. 2, reference numeral 1 denotes a data processor, 2 denotes a terminal unit, 3a denotes a mouse of the terminal unit 2, and 4 denotes a printer for the data processor 1 (or of the data processor system).

As shown in FIG. 2, the data processor 1 has a data file 30 for storing data to be printed, a print program 31 for printing the data stored in the data file 30, and a page turning program 32 for carrying out a page turning process that is characteristic of the present invention.

According to a user's request, the page turning program 32 retrieves requested print data and displays the same on a display of the terminal unit 2.

Figure 3:
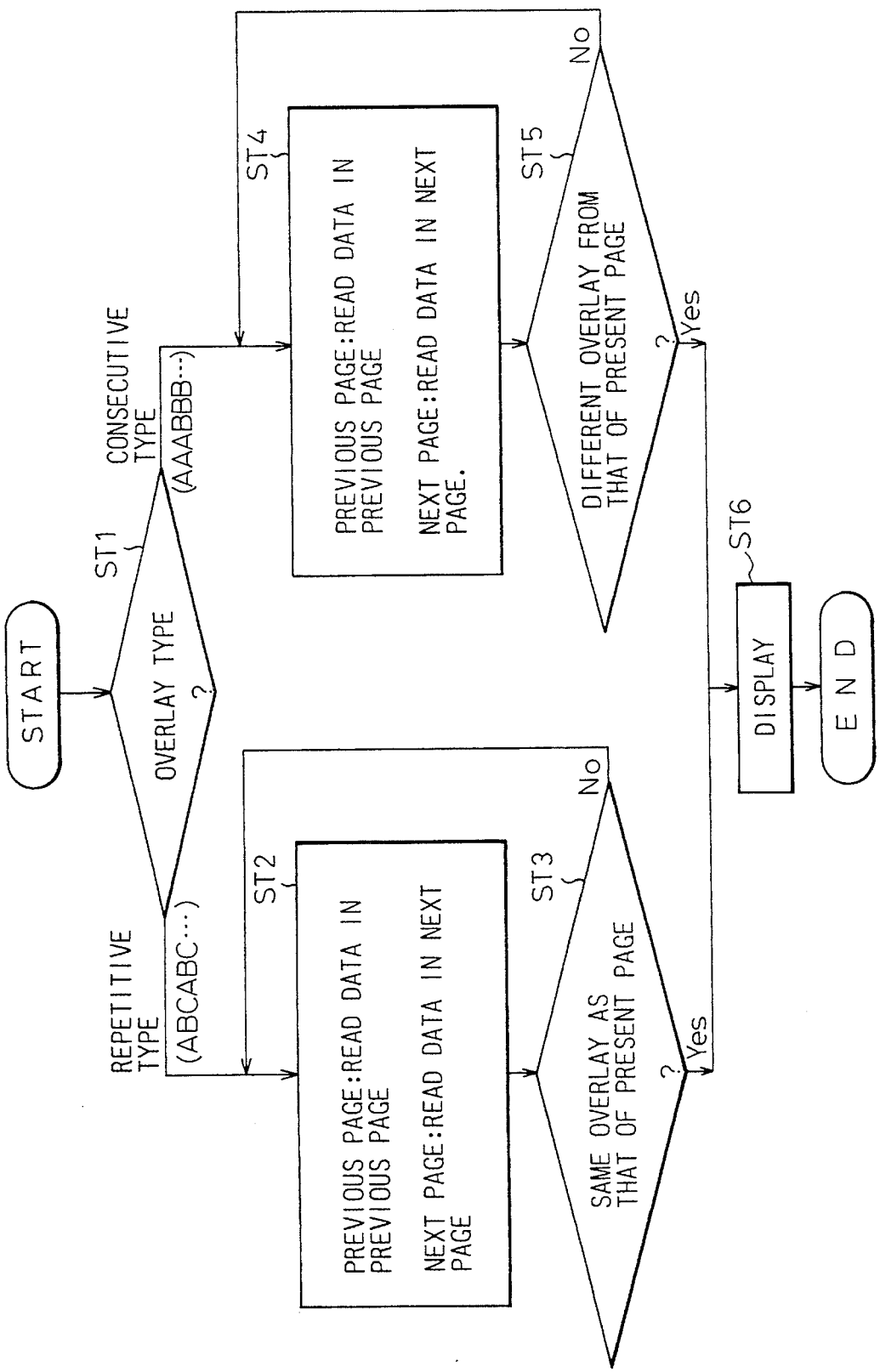
FIG. 3 is a flowchart showing a first example of a page turning process of a data processor according to the present invention.
Figure 4:
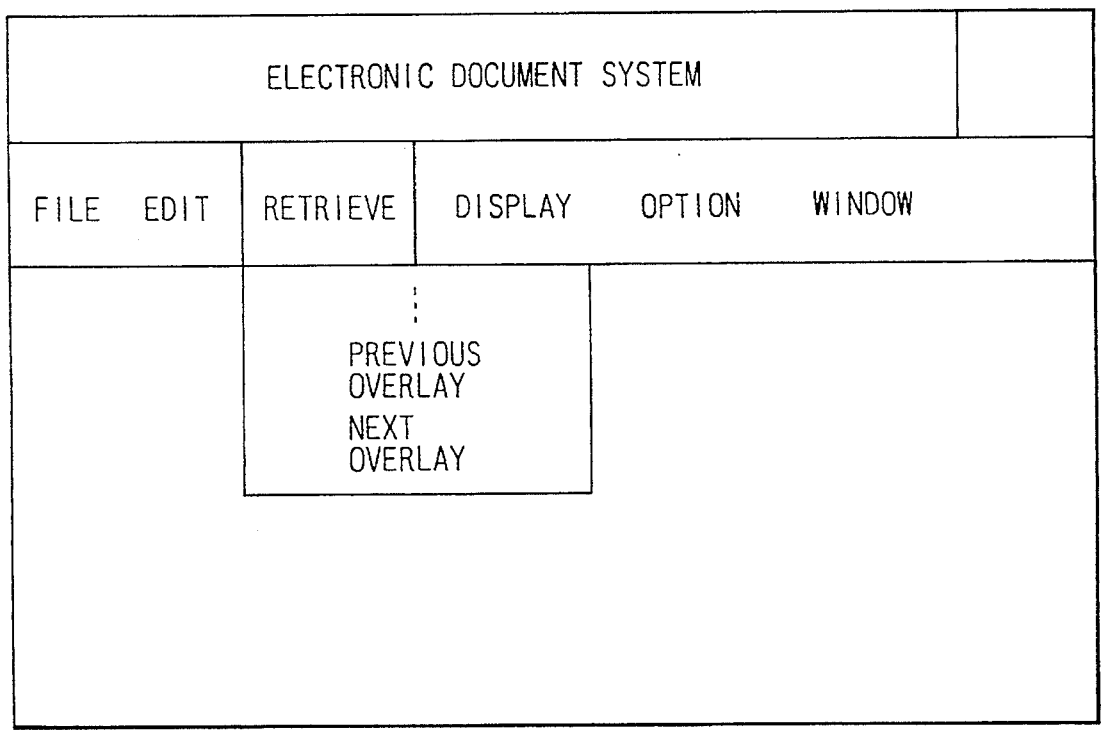
FIG. 4 is a diagram showing a menu screen of a data processor system applying the page turning process of FIG. 3.

FIG. 3 shows a flow of a first example of the page turning program 32, and FIG. 4 shows a menu screen of a data processor system applying the page turning program 32 of FIG. 3.

This page turning program 32 of FIG. 3 is applicable when the data file 30 (with reference to FIG. 2) stores a plurality of data sets each containing a plurality of document data units with different overlays. These data units [for example, ABCABCABC ......] are called repetitive data. The program is also applicable when the data file 30 stores a plurality of groups each containing a plurality of document data units with the same overlay. These data units [for example, AAABBBCCC ......] are called consecutive data.

The page turning program 32 is started when "RETRIEVE" in a menu screen of FIG. 4 is selected with the mouse 3a and when any one of "PERVIOUS OVERLAY" and "NEXT OVERLAY" is selected with the mouse 3a.

First, in Step ST1, an overlay type is discriminated. Namely, in Step ST1, it is determined whether the type of print data stored in the data file 30 is repetitive or consecutive. This determination may be carried out according to information interactively entered by a user, or management data stored in the data file 30.

In Step ST1, when the print data stored in the data file 30 are determined to be repetitive data, the flow proceed to Step ST2. In Step ST2, document data of a page behind the present page is read out from the data file 30, when it is the previous overlay retrieve mode, i.e., the previous page retrieve mode; and document data of a page ahead of the present page is read out from the data file 30, when it is the next overlay retrieve mode, i.e., the next page retrieve mode.

Further, in Step ST3, it is determined whether or not that the overlay of the document data read in the Step ST2 is equal to the overlay of document data in the present page now being displayed. If the overlays are unequal to each other, the flow returns to Step ST2. If the overlays are equal to each other, the read document data are displayed (Step ST6), and the flow ends.

Figure 5:
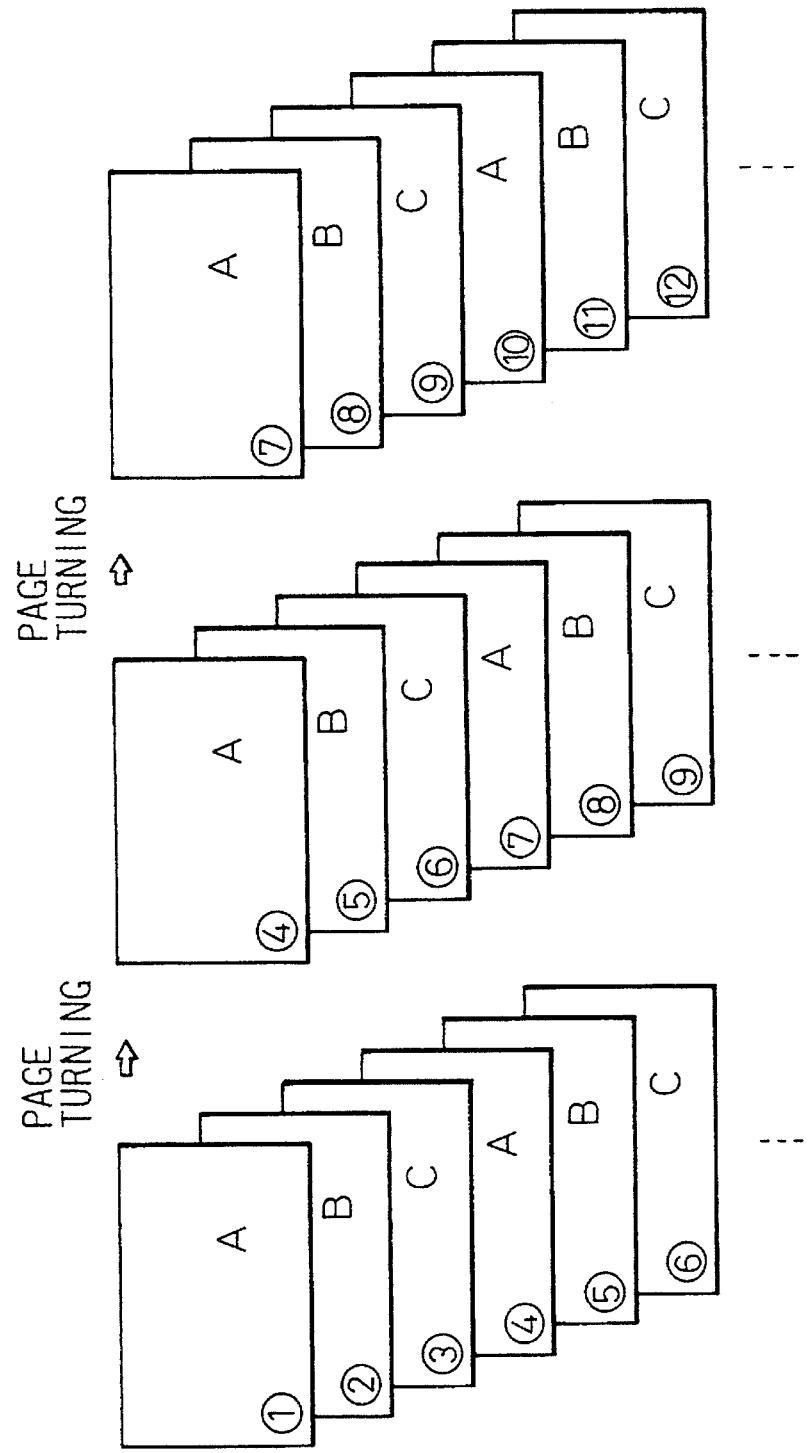
FIG. 5 is a diagram for explaining an example of the page turning process of FIG. 3.

FIG. 5 shows document data units A, B, and C having overlays A, B, and C, respectively. The document data units A, B, and C repeat in order of A, B, and C, i.e., A→B→C→A→B→C→A→B→C→....... In Steps ST2 and ST3, a document data unit in a page, which has the same overlay as the present page and is nearest to and in front of or behind the present page, is retrieved. Further, in Step ST6, the retrieved data unit is displayed. Namely, in the case that a data unit "A" of ① (page 1) is displayed on the display of the terminal unit 2, which is the state shown at the left of FIG. 5, and when a next page instruction is input by the input unit 3 (or the mouse 3a), a data unit "A" of ④ is displayed on the display, which is the state shown at the center of FIG. 5. Continuously, when a next page instruction is additionally input by the input unit 3, a data unit "A" of ⑦ is displayed on the display, which is the state shown at the right of FIG. 5.

Conversely, in the case that a data unit "A" of ⑦ (page 7) is displayed on the display of the terminal unit 2, which is the state shown at the right of FIG. 5, and when a previous page instruction is input by the input unit 3, a data unit "A" of ④ is displayed on the display, which is the state shown at the center of FIG. 5. Continuously, when a previous page instruction is additionally input by the input unit 3, a data unit "A" of ① is displayed on the display, which is the state shown at the left of FIG. 5.

In Step ST1, when it is determined that the print data stored in the data file 30 are consecutive data, the flow proceed to Step ST4. In Step ST4, document data of a page behind the present page is read out from the data file 30, when it is the previous overlay retrieve mode, i.e., the previous page retrieve mode; and document data of a page ahead of the present page is read out from the data file 30, when it is the next overlay retrieve mode, i.e., the next page retrieve mode.

Further, in Step ST5, it is discriminated that whether or not the overlay of the document data read in Step ST4 is unequal to the overlay of the document data in the present page. If the overlays are equal to each other, the flow returns to Step ST4. If the overlays are unequal to each other, the read document data are displayed (Step ST6), and the flow ends.

Figure 6:
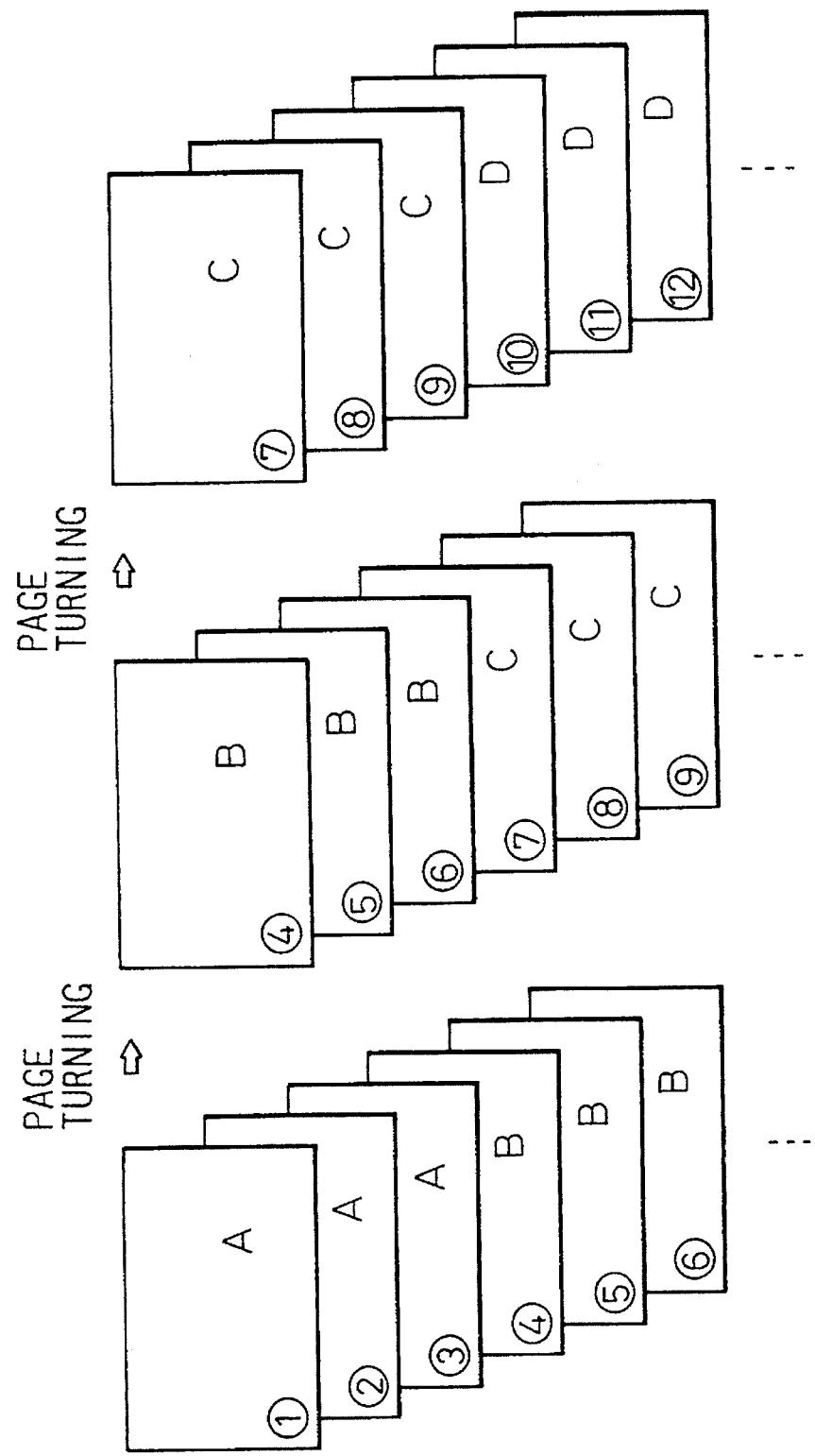
FIG. 6 is a diagram for explaining another example of the page turning process of FIG. 3.

FIG. 6 shows document data units A, B, and C having overlays A, B, and C, respectively. The document data units A, B, and C consecutively arranged in order of A, A, A, B, B, B, C, C, and C, i.e., A→A→A→B→B→B→C→C→C→....... In Steps ST4 and ST5, a document data unit in a page, which has a different overlay from the present page and is nearest to and in front of or behind the present page, is retrieved. Further, in Step ST6, the retrieved data unit is displayed. Namely, in the case that a data unit "A" of ① (page 1) is displayed on the display of the terminal unit 2, which is the state shown at the left of FIG. 6, and when a next page instruction is input by the input unit 3 (or the mouse 3a), a data unit "B" of ④ is displayed on the display, which is the state shown at the center of FIG. 6. Continuously, when a next page instruction is additionally input by the input unit 3, a data unit "C" of ⑦ is displayed on the display, which is the state shown at the right of FIG. 6.

Conversely, in the case that a data unit "C" of ⑦ (page 7) is displayed on the display of the terminal unit 2, which is the state shown at the right of FIG. 6, and when a previous page instruction is input by the input unit 3, a data unit "B" of ④ is displayed on the display, which is the state shown at the center of FIG. 6. Continuously, when a previous page instruction is additionally input by the input unit 3, a data unit "A" of ① is displayed on the display, which is the state shown at the left of FIG. 6.

Figure 7:
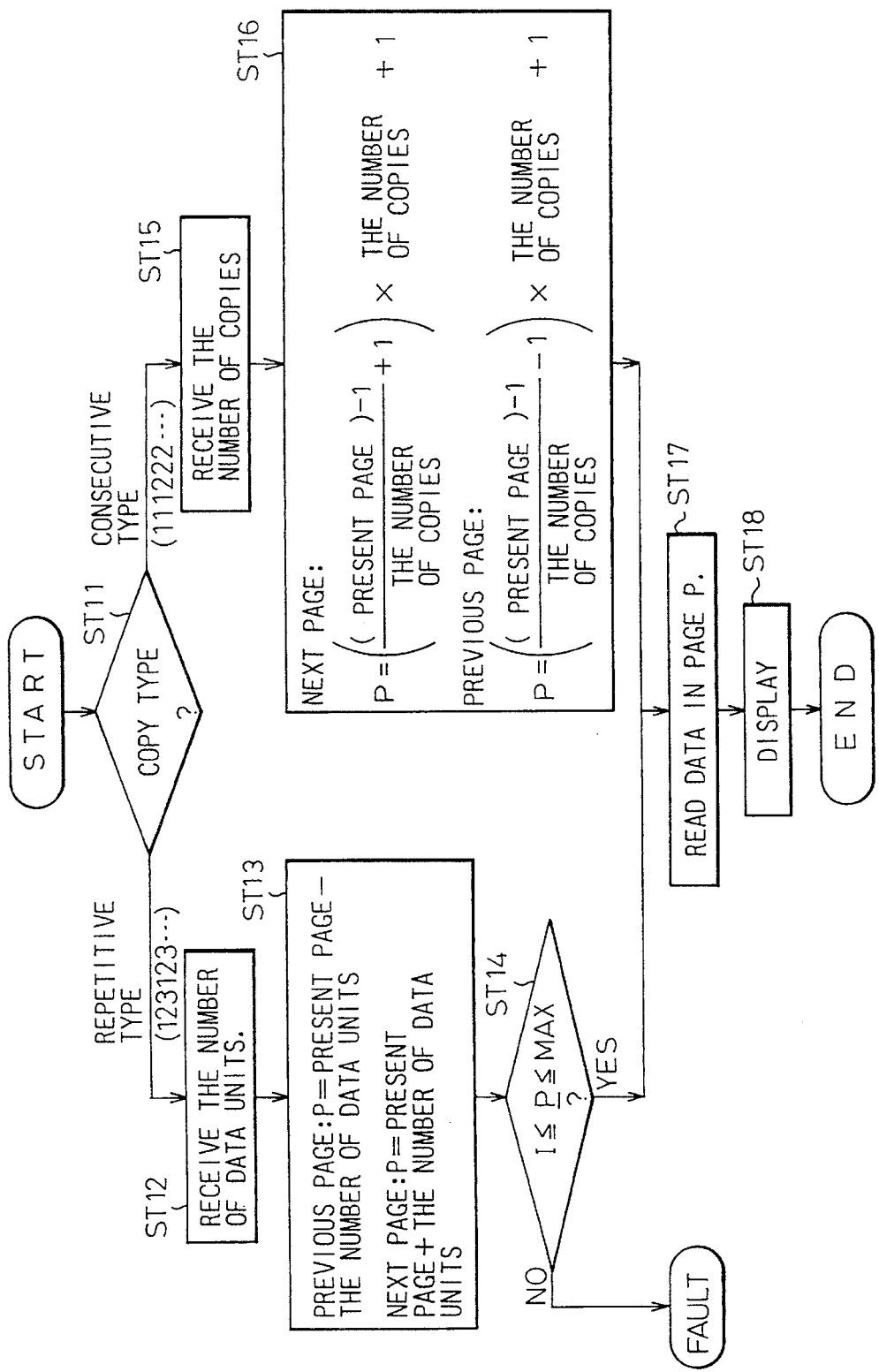
FIG. 7 is a flowchart showing a second example of a page turning process of a data processor according to the present invention.
Figure 8:
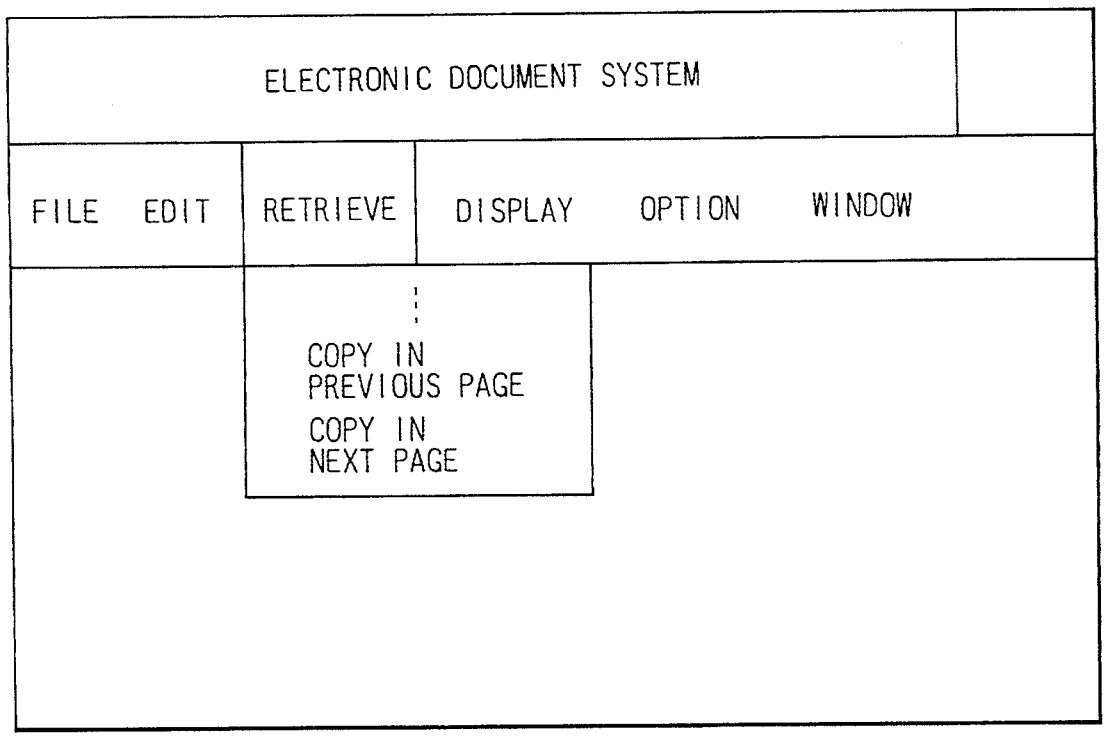
FIG. 8 is a diagram showing a menu screen of a data processor system applying the page turning process of FIG. 7.

FIG. 7 shows a flow of a second example of the page turning program 32, and FIG. 8 shows a menu screen of a data processor system applying the page turning process of FIG. 7.

This page turning program 32 of FIG. 7 is applicable when the data file 30 (with reference to FIG. 2) stores copies of a set of different data units. These copies [for example, 123123123 ......] are called repetitive data. The flow of FIG. 7 is also applicable when the data file 30 stores a plurality of groups each containing copies of a data unit. These copies [for example, 111222333 ......] are called consecutive data.

The page turning program 32 is started when "RETRIEVE" in a menu screen of FIG. 8 is selected with the mouse 3a and when any one of "PREVIOUS PAGE" and "NEXT PAGE" is selected with the mouse 3a. As shown in FIG. 7, in Step ST11, the type of print data stored in the data file 30 is determined whether it is repetitive or consecutive. This determination may be carried out according to information interactively entered by a user, or management data stored in the data file 30.

In Step ST11, when it is determined that the print data stored in the data file 30 are repetitive data, the flow proceed to Step ST12. In Step ST12, the number of data units in each group is determined through an interactive process with a user or by referring to the management data stored in the data file 30 is received, and the flow proceed to Step ST13.

In Step ST13, when it is the previous copy retrieve mode, i.e., the previous page mode, a page P is calculated in accordance with the present page now being displayed and the number received in Step ST12, as follows:

P=present page−the number of data units in each set    (a)

Further, in Step ST13, when it is the next copy retrieve mode, i.e., the next page mode, a page P is calculated in accordance with the present page now being displayed and the number received in Step ST12, as follows:

$$P = \text{present page} + \text{the number of data units in each set} \quad (b)$$

In addition, the flow proceeds to Step ST14, and it is determined whether or not the equation $1 \leq p \leq MAX$ is satisfied. Note that, the reference "MAX" denotes the maximum number of the pages, or the last page number.

In Step ST14, when it is discriminated that the equation $1 \leq P \leq MAX$ is not satisfied, a specific fault process (or error process) is carried out. This fault process is, for example, stopping the function of the previous operation key and displaying a fault message or displaying the previous display image (continuously displaying the previous image on the display of the terminal unit 2). On the other hand, in Step ST14, when it is discriminated that the equation $1 \leq P \leq MAX$ is satisfied, the the flow proceeds to Step ST17.

In Step ST17, a data unit of the page P, which is calculated in Step ST13, is read out from the data file 30 and is displayed (Step ST18) on the display of the terminal unit 2.

FIG. 9 shows an example of the page turning process of FIG. 7. Concreteley, FIG. 9 shows data units (1), (2), and (3) that are repeated in order of (1), (2), and (3), i.e., (1)→(2)→(3)→(1)→(2)→(3)→(1)→(2)→(3)→. . . . . . . In Steps ST13, ST14, and ST17, a document data unit in a page (retrieved page P) is the same as that in the present page and in a page nearest to and in front of or behind the present page. In Step ST18, the retrieved data unit is displayed on the display of the terminal unit 2. Namely, in the case that a data unit "(1)" of ① (page 1) is displayed on the display of the terminal unit 2, which is the state shown at the left of FIG. 9, and when a next page instruction is input by the input unit 3 (or the mouse 3a), a data unit "(1)" of ④ is displayed on the display, which is the state shown at the center of FIG. 9. Continuously, when a next page instruction is additionally input by the input unit 3, a data unit "(1)" of ⑦ is displayed on the display, which is the state shown at the right of FIG. 9.

Conversely, in the case that a data unit "(1)" of ⑦ (page 7) is displayed on the display of the terminal unit 2, which is the state shown at the right of FIG. 9, and when a previous page instruction is input by the input unit 3, a data unit "(1)" of ④ is displayed on the display, which is the state shown at the center of FIG. 9. When a previous page instruction is additionally input by the input unit 3, a data unit "(1)" of ① is displayed on the display, which is the state shown at the left of FIG. 9.

In Step ST11, when it is determined that the print data stored in the data file 30 are consecutive data, the flow proceed to Step ST15. In Step ST15, the number of data units in each group through an interactive process with a user or by referring to the management data stored in the data file 30 is received, and the flow proceed to Step ST16.

In Step ST16, when it is the next copy retrieve mode, i.e., the next page mode, a page P is calculated in accordance with the page being displayed and the number received in Step ST12, as follows:

$$P = \{[(\text{present page}-1)/\text{the number of copies}]+1\} \times \text{the number of copies}+1 \quad (c)$$

Further, in Step ST16, when it is the previous copy retrieve mode, i.e., the previous page mode, a page P is calculated in accordance with the page being displayed and the number received in Step ST15, as follows:

$$P = \{[(\text{present page}-1)/\text{the number of copies}]-1\} \times \text{the number of copies}+1 \quad (d)$$

In the above equations (c) and (d), when a result of the division involves decimals, they will be omitted.

Further, the flow proceed to Step ST17, and a data unit of the page P, which is calculated in Step ST16, is read out from the data file 30 and is displayed (Step ST18) on the display of the terminal unit 2.

FIG. 10 shows another example of the page turning process of FIG. 7. Concretely, FIG. 10 shows data units (1), (2), and (3) that are consecutively arranged in order of (1), (1), (1), (2), (2), (2), (3), (3), and (3), i.e., (1)→(1)→(1)→(2)→(2)→(2)→(3)→(3)→(3)→. . . . . . . In Steps ST16 and ST17, a document data unit in a page (retrieved page P) is different from the data unit in the present page and in a page nearest to and in front of or behind the present page. In Step ST18, the retrieved data unit is displayed on the display of the terminal unit 2. Since decimals in a result of the division in the equations (c) and (d) are omitted, it is possible to always retrieve a data unit that is different from the data unit in the present page and in a page nearest to and in front of or behind the present page, even if the present page is not at the head in the corresponding group.

Namely, in the case that a data unit "(1)" of ① (page 1) is displayed on the display of the terminal unit 2, which is the state shown at the left of FIG. 10, and when a next page instruction is input by the input unit 3 (or the mouse 3a), a data unit "(2)" of ④ is displayed on the display, which is the state shown at the center state of FIG. 10. When a next page instruction is additionally input by the input unit 3, a data unit "(3)" of ⑦ is displayed on the display, which is the state shown at the right of FIG. 10.

Conversely, in the case that a data unit "(3)" of ⑦ (page 7) is displayed on the display of the terminal unit 2, which is the state shown at the right of FIG. 10, and when a previous page instruction is input by the input unit 3, a data unit "(2)" of ④ is displayed on the display, which is the state shown at the center of FIG. 10. Continuously, when a previous page instruction is additionally input by the input unit 3, a data unit "(1)" of ① is displayed on the display, which is the state shown at the left of FIG. 10.

As described above, when managing a plurality of data sets each containing a plurality of data units of different kinds, the present invention quickly retrieves a data unit that is of the same kind as a data unit in the present page and in a page nearest to and in front of or behind the present page. Further, when managing a plurality of data groups each containing a plurality of data units of the same kind, the present invention quickly retrieves a data unit that is of a different kind from a data unit in the present page and in a page nearest to and in front of or behind the present page.

Further, as described above, when managing copies of a set of different data units, the present invention quickly retrieves a data unit that is the same as a data unit in the present page and in a page nearest to and in front of or behind the present page. In addition, when managing a plurality of groups each containing copies of a data unit, the present invention quickly retrieves a data unit that is different from a data unit in the present page and in a page nearest to and in front of or behind the present page.

Consequently, the present invention efficiently turns pages according to the attributes of data in the pages.

Many different embodiments of the present invention may be constructed without departing from the spirit and scope of the present invention, and it should be understood that the present invention is not limited to the specific embodiments described in this specification, except as defined in the appended claims.

We claim:

1. A data processor having a page turning function, for managing a plurality of data sets each containing a plurality of data units of different kinds, wherein said data processor comprises:

extraction means for extracting a data unit in a page ahead of the present page in response to a next page instruction, or in a page behind the present page in response to a previous page instruction;

decision means for determining whether or not the kind of the data unit extracted by said extraction means is equal to the kind of a data unit in the present page; and output control means for providing the data unit extracted by said extraction means if said decision means determines that the kind of the data unit extracted by said extraction means is equal to the kind of the data unit in the present page, and restarting the extraction process of said extracting means if said decision means determines that the kind of the data unit extracted by said extraction means is not equal to the kind of the data unit in the present page.

2. A data processor as claimed in claim 1, wherein said data processor further comprises:

input/output control means for controlling input/output processes between said data processor and a terminal;

data management means for managing said plurality of data sets; and display control means for displaying a data unit on a display of said terminal.

3. A data processor having a page turning function, for managing a plurality of data groups each containing a plurality of data units of the same kind, wherein said data processor comprises:

extraction means for extracting a data unit in a page ahead of the present page in response to a next page instruction, or in a page behind the present page in response to a previous page instruction;

decision means for determining whether or not the kind of the data unit extracted by said extraction means is unequal to the kind of a data unit in the present page; and output control means for providing the data unit extracted by said extraction means if said decision means determines that the kind of the data unit extracted by said extraction means is equal to the kind of data unit in the present page, and restarting the extraction process of said extracting means if said decision means determines that the kind of the data unit extracted by said extraction means is not equal to the kind of data unit in the present page.

4. A data processor as claimed in claim 3, wherein said data processor further comprises:

input/output control means for controlling input/output processes between said data processor and a terminal;

data management means for managing said plurality of data groups: and display control means for displaying a data unit on a display of said terminal.

5. A data processor having a page turning function, for managing copies of a set of different data units, wherein said data processor comprises:

reception means for receiving the number of the data units in said set; and extraction means for specifying a data unit in a page calculated by adding the number received by said reception means to the number of the present page in response to a next page instruction, or by subtracting the number received by said reception means from the number of the present page in response to a previous page instruction, extracting the specified data unit, and providing the extracted data unit.

6. A data processor as claimed in claim 5, wherein said data processor further comprises:

input/output control means for controlling input/output processes between said data processor and a terminal;

data management means for managing the copies of said set; and display control means for displaying a data unit on a display of said terminal.

7. A data processor having a page turning function, for managing a plurality of groups each containing copies of a data unit, wherein said data processor comprises:

reception means for receiving the number of the copies in each group; and extraction means for specifying, according to the number of the present page and the number received by said reception means, a different data unit in a page that is in front of and nearest to the present page in response to a next page instruction, or in a page that is behind and nearest to the present page in response to a previous page instruction, extracting the specified data unit, and providing the extracted data unit.

8. A data processor as claimed in claim 7, wherein said data processor further comprises:

input/output control means for controlling input/output processes between said data processor and a terminal;

data management means for managing said plurality of groups; and display control means for displaying a data unit on a display of said terminal.

9. A data processor system including a data processor, a terminal unit connected to said data processor having a display for displaying a data unit, and an input unit connected to said terminal unit for inputting page turning instructions, wherein said data processor comprises:

extraction means for extracting a data unit in a page ahead of the present page in response to a next page instruction of said page turning instructions, or in a page behind the present page in response to a previous page instruction of said page turning instructions;

decision means for determining whether or not the kind of the data unit extracted by said extraction means is equal to the kind of a data unit in the present page; and output control means for providing the data unit extracted by said extraction means if said decision means determines that the kind of the data unit extracted by said extraction means is equal to the kind of data unit in the present page, and restarting the extraction process of said extraction means if said decision means determines that the kind of the data unit extracted by said extraction means is not equal to the kind of data unit in the present page.

10. A data processor system as claimed in claim 9, wherein said data processor further comprises:

input/output control means for controlling input/output processes between said data processor and said terminal unit;

data management means for managing a plurality of data sets each containing a plurality of data units of different kinds; and display control means for displaying a data unit on the display of said terminal unit.

11. A data processor system including a data processor, a terminal unit connected to said data processor having a display for displaying a data unit, and an input unit connected to said terminal unit for inputting page turning instructions, wherein said data processor comprises:

extraction means for extracting a data unit in a page ahead of the present page in response to a next page instruction of said page turning instructions, or in a page behind the present page in response to a previous page instruction of said page turning instructions;

decision means for determining whether or not the kind of the data unit extracted by said extraction means is unequal to the kind of a data unit in the present page; and output control means for providing the data unit extracted by said extraction means if said decision means determines that the kind of the data unit extracted by said extraction means is equal to the kind of data unit in the present page, and restarting the extraction process of said extracting means if said decision means determines that the kind of the data unit extracted by said extraction means is not equal to the kind of data unit in the present page.

12. A data processor system as claimed in claim 11, wherein said data processor further comprises:

input/output control means for controlling input/output processes between said data processor and said terminal unit;

data management means for managing a plurality of data groups each containing a plurality of data units of the same kind; and display control means for displaying a data unit on the display of said terminal unit.

13. A data processor system including a data processor, a terminal unit connected to said data processor having a display for displaying a data unit, and an input unit connected to said terminal unit for inputting page turning instructions, wherein said data processor comprises:

reception means for receiving a number of data units in a set; and extraction means for specifying a data unit in a page calculated by adding the number received by said reception means to the number of the present page in response to a next page instruction of said page turning instructions, or by subtracting the number received by said reception means from the number of the present page in response to a previous page instruction of said page turning instructions, extracting the specified data unit, and providing the extracted data unit.

14. A data processor system as claimed in claim 13, wherein said data processor further comprises:

input/output control means for controlling input/output processes between said data processor and said terminal unit;

data management means for managing copies of said set of different data units; and display control means for displaying a data unit on the display of said terminal unit.

15. A data processor system including a data processor, a terminal unit connected to said data processor having a display for displaying a data unit, and an input unit connected to said terminal unit for inputting page turning instructions, wherein said data processor comprises:

reception means for receiving a number of copies in each group; and extraction means for specifying, according to the number of the present page and the number received by said reception means, a different data unit in a page that is in front of and nearest to the present page in response to a next page instruction, of said page turning instructions, or in a page that is behind and nearest to the present page in response to a previous page instruction of said page turning instructions, extracting the specified data unit, and providing the extracted data unit.

16. A data processor system as claimed in claim 15, wherein said data processor further comprises:

input/output control means for controlling input/output processes between said data processor and said terminal unit;

data management means for managing a plurality of groups each containing copies of a data unit; and display control means for displaying a data unit on the display of said terminal unit.

17. A method of turning pages among a plurality of data sets each containing a plurality of data units of different kinds, wherein said method comprises:

a first step of extracting a data unit in a page ahead of the present page in response to a next page instruction; or in a page behind the present page in response to a previous page instruction;

a second step of determining whether or not the kind of the data unit extracted in said first step is equal to the kind of a data unit in the present page; and a third step of providing the data unit extracted in said first step if said second step determines that the kind of the data unit extracted by said extraction means is equal to the kind of data unit in the present page; and restarting the extraction process of said first step if said decision means determines that the kind of the data unit extracted by said extraction means is not equal to the kind of data unit in the present page.

18. A method of turning pages among a plurality of data groups each containing a plurality of data units of the same kind, wherein said method comprises:

a first step of extracting a data unit in a page ahead of the present page in response to a next page instruction, or in a page behind the present page in response to a previous page instruction;

a second step of determining whether or not the kind of the data unit extracted in said first step is unequal to the kind of a data unit in the present page; and a third step of providing the data unit extracted in said first step if said second step determines they the kind of the data unit extracted by said extraction means is equal to the kind of data unit in the present page, and restarting the extraction process of said first step if said decision means determines that the kind of the data unit extracted by said extraction means is not equal to the kind of data unit in the present page.

19. A method of turning pages among copies of a set of different data units, wherein said method comprises:

a first step of receiving the number of the data units in said set; and a second step of specifying a data unit in a page calculated by adding the number received in said first step to the number of the present page in response to a next page instruction, or by subtracting the number received by said first step from the number of the present page in response to a previous page instruction, extracting the specified data unit, and providing the extracted data unit.

20. A method of turning pages among a plurality of groups each containing copies of a data unit, wherein said method comprises:

a first step of receiving the number of the copies in each group; and a second step of specifying, according to the number of the present page and the number received in said first step, a different data unit in a page that is in front of and nearest to the present page in response to a next page instruction, or in a page that is behind and nearest to the present page in response to a previous page instruction, extracting the specified data unit, and providing the extracted data unit.

* * * * *